United States Patent [19]

Morimoto

[11] Patent Number: 5,128,814
[45] Date of Patent: Jul. 7, 1992

[54] TAP LOADING APPARATUS INCLUDING A PINCH ROLLER MOVING APPARATUS

[75] Inventor: Takao Morimoto, Hyogo, Japan

[73] Assignee: Mitsubishi Denki Kabushiki Kaisha, Tokyo, Japan

[21] Appl. No.: 514,940

[22] Filed: Apr. 26, 1990

[30] Foreign Application Priority Data

Apr. 28, 1989 [JP] Japan .................. 1-107686

[51] Int. Cl.⁵ .......................... C11B 5/027
[52] U.S. Cl. .......................... 360/85; 360/95
[58] Field of Search .................. 360/85, 95

[56] References Cited

U.S. PATENT DOCUMENTS

| | | | |
|---|---|---|---|
| 4,780,775 | 10/1988 | Hirose et al. | 360/85 |
| 4,907,110 | 3/1990 | Ardo | 360/85 |
| 4,951,163 | 8/1990 | Nakamichi | 360/85 |

FOREIGN PATENT DOCUMENTS 63-52147 4/1988 Japan .

*Primary Examiner*—David J. Severin
*Attorney, Agent, or Firm*—Burns, Doane, Swecker & Mathis

[57] ABSTRACT

A tape loading apparatus according to the present invention comprises a cam gear and a first and second arms that are pivotally mounted by a chassis. The second arm has a guiding pin, and engages the first arm through an urging spring mounted between the two arms. The first arm member is provided with a guiding pin at one end portion thereof which engages a cam groove of the cam gear and is guided along the cam groove from a first end to a second end of the groove when the cam is rotated. Before the guiding pin reaches the second end of the cam groove, the pinch roller abuts a capstan and is the pressed against the capstan by an urging force of the spring when the guiding pin reaches the second end of the case cam groove.

1 Claim, 9 Drawing Sheets

PRIOR ART

PRIOR ART

FIG. 8

PRIOR ART

FIG. 9

PRIOR ART

FIG. 10

PRIOR ART

FIG. 11

PRIOR ART

TAP LOADING APPARATUS INCLUDING A PINCH ROLLER MOVING APPARATUS

BACKGROUND OF THE INVENTION

1. Field of the Invention

The present invention relates to a tape loading apparatus by which a magnetic tape is advanced while it is in contact with a rotary head drum of a digital audio tape recorder (DAT).

2. Prior Art

Figure 6:
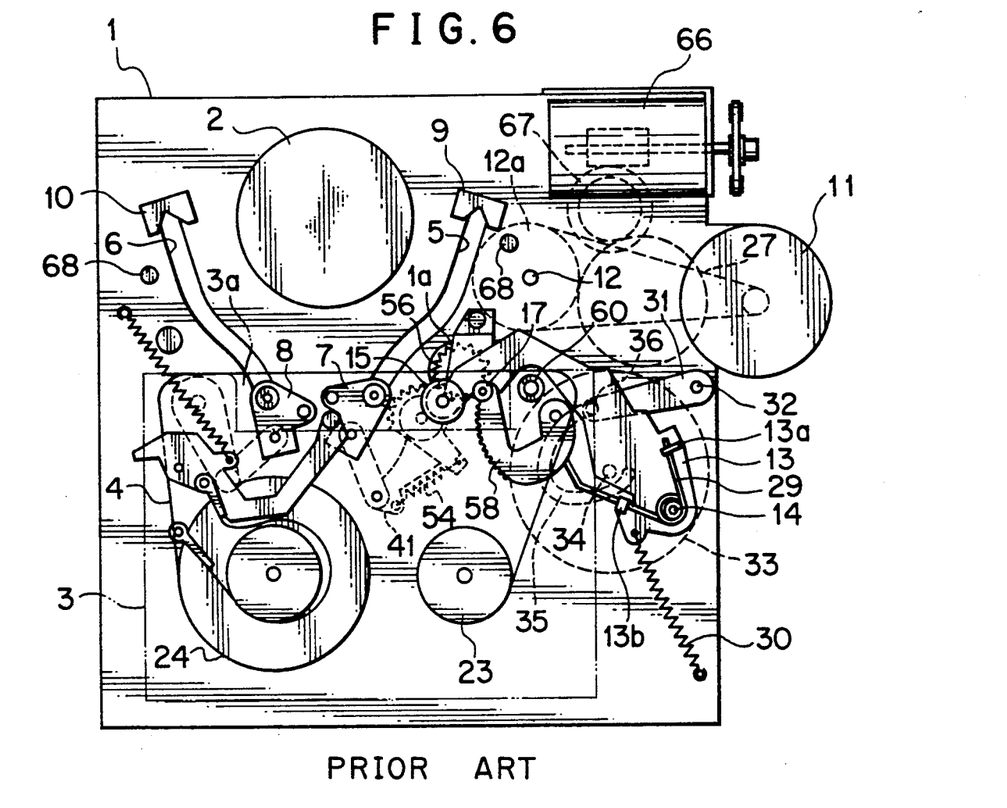
FIG. 6 is a top view showing a tape loading apparatus, in particular, of a prior art digital audio tape recorder.
Figure 7A:
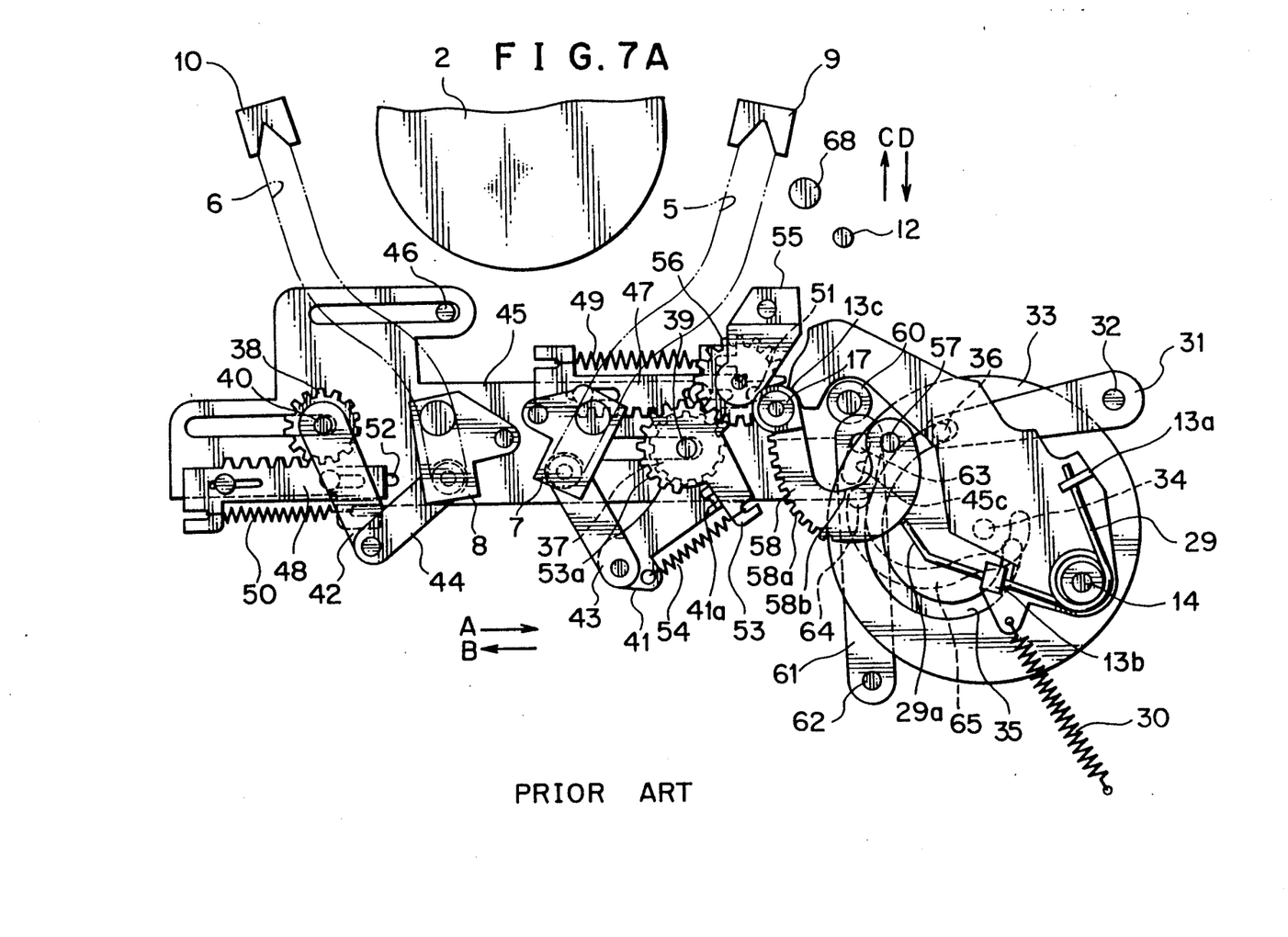
FIGS. 7A-7B are expanded views of an essential part of FIG. 6.
Figure 7B:
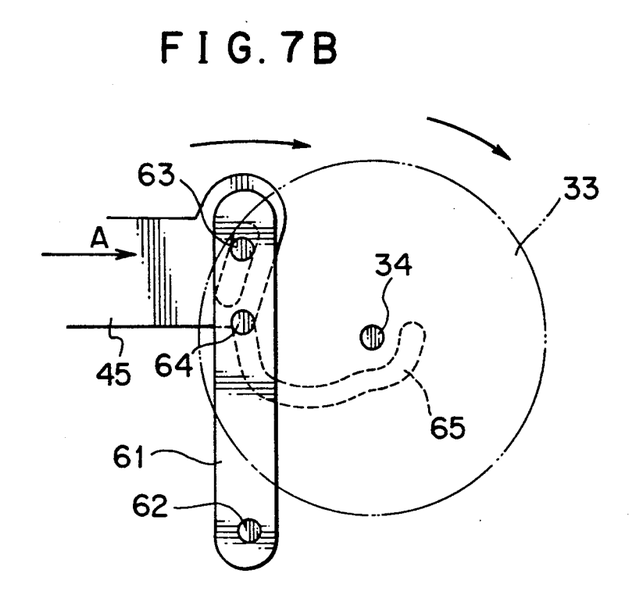

FIG. 6 is a top view showing a mechanism of a prior art digital audio tape recorder disclosed by Japanese Patent Preliminary Publication No. 63-211152 and FIG. 7 is an expanded view of an essential part of the mechanism in FIG. 6.

A tape cassette 3 is held by a suitable holder which is supported by a chassis 1. A magnetic tape 4 from a supply reel 24 is reeled by a take-up reel 23. The chassis 1 is formed with a pair of guiding slots 5 and 6 therein in which a pair of guiding posts 7 and 8 are slidably supported. Guide stoppers 9 and 10 are secured to the chassis 1 to receive the guiding posts 7 and 8 when the loading of the magnetic tape 4 is completed. A capstan motor 11 drives a capstan shaft 12 into rotation through a belt 27 and a flywheel 12a.

A pinch roller arm 13 is pivotally supported by a supporting pin 14 which is secured in an upright position to the chassis 1. A pinch roller 15 is rotatably attached to a tip end portion of the arm 13. A twist spring 29 is held at each end thereof on hooks 13a and 13b in a compressed manner as shown in FIG. 7. A tension spring 30 urges the pinch roller arm 13 such that the pinch roller 13 tends to pivot in a counterclockwise direction. A clamping lever 31 is pivotally supported by the chassis 1 by means of a supporting pin 32. A cam gear 33 is formed with a gear portion (not shown) on its outer periphery and a first cam groove 35 on its front surface and a second cam groove 65 on its rear surface. The cam gear 33 is rotatably supported by a supporting pin 34 which is secured to the underside of the chassis 1.

Figure 8:
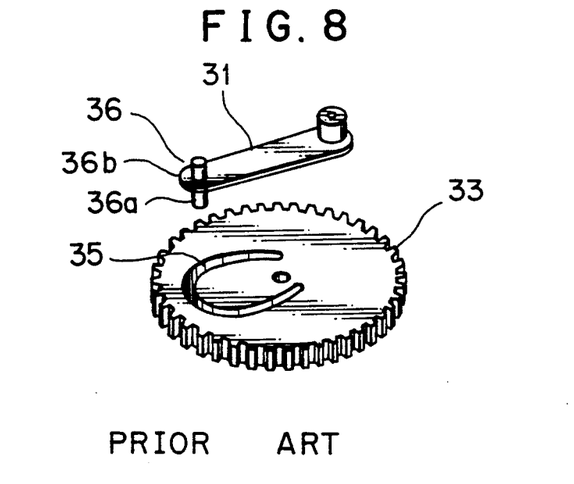
FIG. 8 is a perspective view of a cam gear of FIG. 6.

FIG. 8 is a perspective view of the clamping lever 31 and the cam gear 33. In the figure, an engaging pin 36 extends through the clamping lever 31 at the tip end portion thereof and is secured thereto. A lower end 36a of the pin 36 engages the first cam groove 35 to be guided into a pivotal motion. When the clamping lever 31 is guided into pivotal motion by the cam groove 35 counterclockwise, an upper end 36b of the pin 36 engages one of legs 29a of the twist spring 29 such that the spring 29 is further compressed.

Gears 37 and 38 are rotatably mounted to the underside of the chassis 1 by means of supporting pins 39 and 40, respectively. The gears 37 and 38 has arms 41 and 42, respectively, securely attached thereto. The arm 41 is coupled to the guiding post 7 through a link 43 such that the rotation of the gear 37 causes the guiding post 7 to slide in the guiding slot 5, while the arm 42 is coupled to the guiding post 8 through a link 44 such that the rotation of the gear 38 causes the guiding post 8 to slide in the guiding slot 6. A slide plate 45 is loosely supported by supporting pins 46, 39 and 40 secured to the underside of the chassis 1 such that the slide plate can reciprocally slide in directions of arrows A and B. The slide plate 45 is provided with a first and second racks 47 and 48 thereon, both of which are urged by tension springs 49 and 50 against stoppers 51 and 52 so that they are slidable relative to the slide plate. The racks 47 and 48 are in meshing engagement with the gear 37 and 38, respectively.

Figure 9:
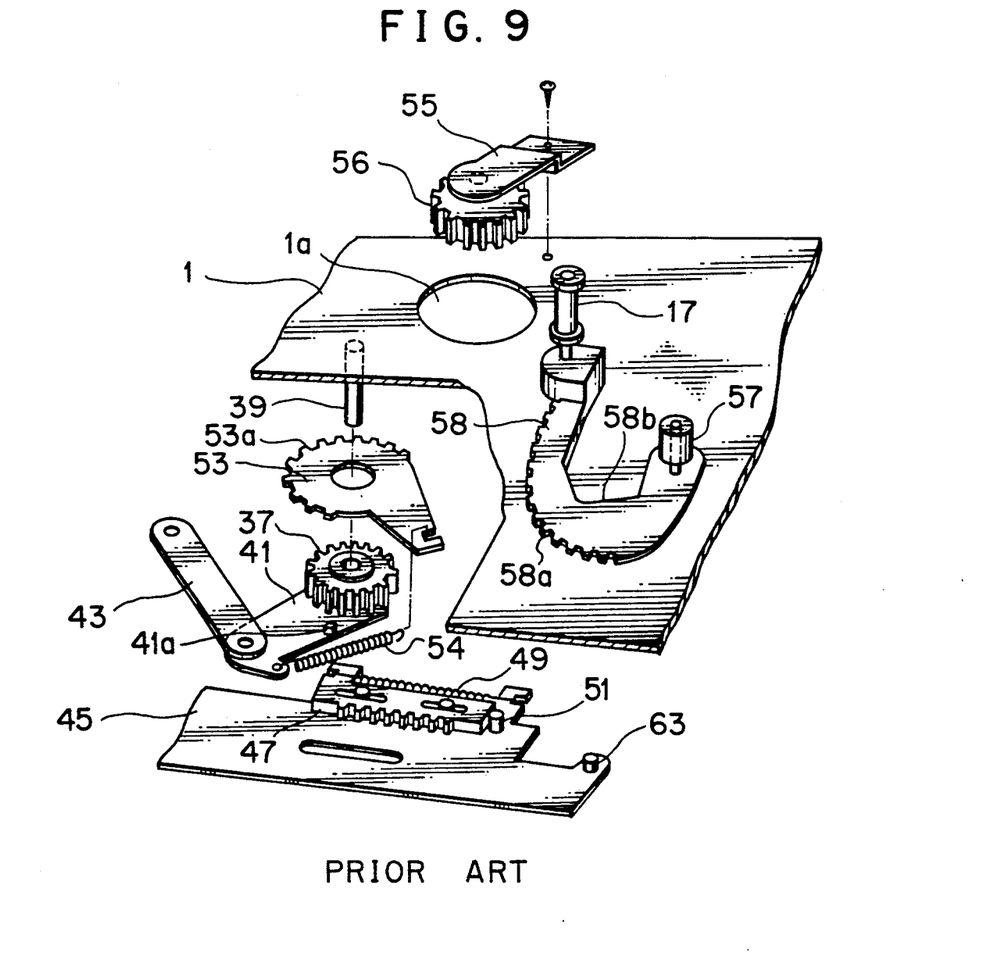
FIG. 9 is an exploded perspective view of an essential part of FIG. 6.

A rotatable member 53 is rotatably supported by the supporting pin 39 about which the gear 37 rotates. The rotatable member 53 is urged clockwise against a stopper 41a by a tension spring 54 that is mounted between the arm 41 and the tip end portion of the rotatable member 53. A bracket 55 secured to the chassis 1 rotatably supports an intermediate gear 56 which extends through a hole 1a in the chassis 1 as shown in FIG. 9 such that the lower end of the gear 56 is in meshing engagement with the rotatable member 53 and the upper end of the gear 56 is in meshing engagement with a gear portion of a tape guiding arm 58.

In FIGS. 6 and 7, the tape guiding arm 58 is pivotally mounted to the chassis 1 by means of a supporting pin 57 secured to the chassis 1. The arm 58 is provided with a tape guiding roller 17 which is rotatably supported at a tip end portion of the arm 58.

Referring to FIG. 7, the tape guiding arm 58 rotates clockwise till an abutment 58b abuts a stopper 60 secured to the chassis 1 such that the tape guiding roller 17 is stopped at a predetermined position. A driven arm 61 is pivotally mounted at one end thereof to the chassis 1 by means of a supporting pin 62, and is provided with an engagement pin 64 at a portion close to the tip end thereof, which engages the second cam groove 65 on the cam gear 33 to be guided into rotation when the cam gear 33 is rotated. The driven arm 61 has a transmitting pin 63 that engages an elongated hole 45c formed in one end portion of the slide plate 45 to thereby cause the slide plate 45 to move in the directions A and B when the arm 61 pivots.

The operation of the prior art digital audio tape recorder, thus described, will now be described.

When the magnetic tape 4 is in the unloading state as shown in FIG. 6, all of the guiding posts 7a and 8, the pinch roller 15, and the tape guiding roller 17 are positioned within the cassette 3. The engagement pin 64 of the transmitting arm 61 is at a large-radius portion of the second cam groove 65 and therefore the slide plate 45 is at the extreme end of its stroke in the direction B. Thus, the tape guiding arm 58 in engagement relation with the intermediate gear 56, is at the most counterclockwise position thereof. Being urged to pivot counterclockwise by the tension spring 30, the pinch roller arm 13 is in abutting relation at an abutment 13c thereof with the tape guiding arm 58 to urge the tape guiding arm 58 counterclockwise at all times, thus eliminating the backlash between the intermediate gear 56 and the arm 58 which would otherwise be encountered.

When a loading motor 66 in FIG. 6 operates to drive the cam gear 33 into clockwise rotation, the engagement pin 64 is guided along the second cam groove 65 causing the transmitting arm 61 to pivot clockwise. This causes the slide plate 45 to slide in the direction A. Being urged against the stoppers 51 and 52, the racks 47 and 48 are moved together with the slide plate 45 in the direction A, causing the gear 37 to rotate clockwise and the gear 38 counterclockwise. The clockwise rotation of the gear 37 causes the guiding post 7 to advance along the guiding groove 5 in a direction C shown in FIG. 7 while the counterclockwise rotation of the gear 38 causes the guiding post 8 to advance along the guiding groove 6 in the direction C. the rotatable member, 53 which is urged by the tension spring 54 against the abutment 41a on the arm 41, is rotated clockwise together with the arm 41 in unison to drive the tape guiding arm 13 into clockwise rotation through the intermediate gear 56. At this time, the pinch roller arm 13 is urged by the tension spring 30, so that the urging force is transmitted from the abutment 13c through the meshing engagement between the gear 56 and the gear portion 58a to the rotatable member 53. However, the biasing force of the tension spring 54 acting on the rotatable member 53 is large enough for the rotation of the rotatable member 53 to overcome the urging force by the tension spring 30. Thus, the pinch roller arm 13 is pushed back by the tape guiding arm 58 being forced to pivot clockwise.

In this manner, the loading motor 66 further operates, so that the magnetic tape 4 in the cassette 3 is drawn out of the cassette 3 by the guiding posts 7 and 8, the pinch roller 15, and the tape guiding roller 17 towards the tape loading position till the abutment 58a of the tape guiding arm 58 abuts the stopper 60. When the tape guiding arm 58 abuts the stopper 60, the guiding posts 7 and 8 are not yet in abutting relation with the guide stoppers 9 and 10 and the slide plate 45 still moves little further in the direction A.

Figure 10:
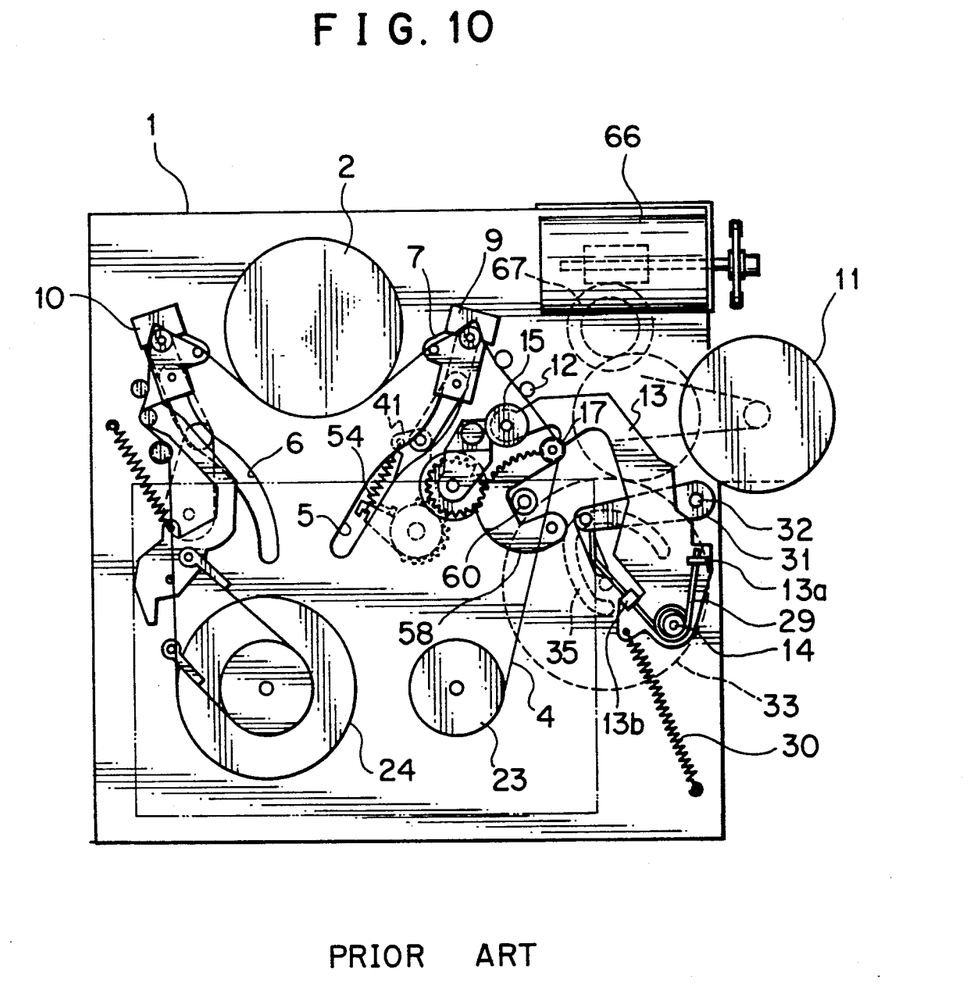
FIG. 10 is a top view showing the tape loading apparatus of FIG. 6 when it is in the first loading state.

When the tape guiding arm 58 abuts the stopper 60, the spring 49 still strongly urges the second rack 47 against the slide plate 45 allowing the second rack 47 to drive the gear 37 into further rotation, but the spring 54 now further stretches yielding to the resistive force exerted thereto by the arm 58 through the gear 56, which resistive force causes the rotatable member 53 to stop the rotation thereof. The guiding posts 7 and 8 are further moved in the direction C to eventually press the stoppers 9 and 10, while the tape guiding arm 58 stops the pivotal motion thereof at a predetermined angular position, a first loading state where the pinch roller 15 is not yet in abutting relation with the capstan shaft 12 as shown in FIG. 10.

In the first loading state, only the rotation of the take up reel 23 causes the magnetic tape 4 to run allowing a high speed searching of the beginning of a desired tune since the tape 4 is in wrapping relation with the rotary head drum 2 at a predetermined angle.

A further clockwise rotation of the loading motor 66 allows the engagement pin 64 to be guided further along the second cam groove 65 which is now a concentric path of a small radius with a center at the pin 34. This causes the transmission arm 61 to stop the pivotal motion thereof which in turn brings the slide plate 45 to a stop. In the mean time, the lower end 36 of the pin 36a, which is in engagement relation with the first cam groove 35, is guided along the groove 35 from a concentric path of a large radius to a spiral path causing the clamping lever 31 to pivot counterclockwise. This pivotal motion of the lever 31 permits the upper end 36b of the engaging pin to abut the leg 29a of the twist spring 29 such that the spring 29 is further compressed. Thus, the pinch roller arm 13 is now urged by the strong urging force of the spring 29 to pivot clockwise overcoming the force of the tension spring 30 which tends to cause the pinch roller 13 to pivot counterclockwise.

Figure 11:
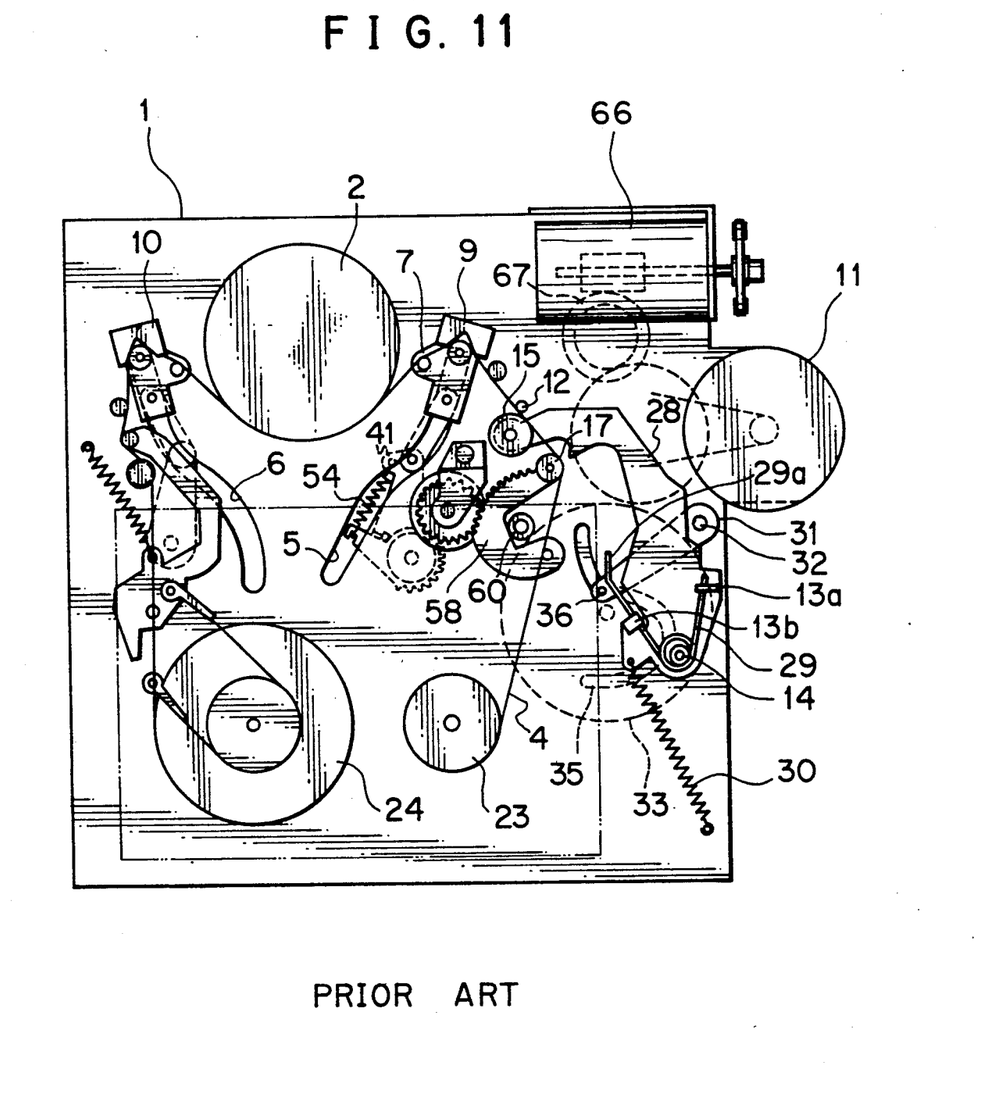
FIG. 11 is a top view showing the tape loading apparatus of FIG. 6 when it is in the second loading state.

The clockwise rotation of the pinch roller arm 13 and the twist spring 29 as a unit allows the pinch roller 15 to abut the capstan shaft 12 with the magnetic tape 4 being sandwiched therebetween. Further clockwise pivotal motion of the engaging lever 31 causes a further compression of the twist spring 29 producing a small clearance between the leg 29a and the hooks 13b allowing the pinch roller 15 to press the magnetic tape 4 against the capstan shaft 12. The apparatus is now in a second loading state, where the capstan is driven by the capstan motor 11 into rotation to thereby allow the magnetic tape 4 to run for recording and reproducing operations by the rotary head drum 2.

SUMMARY OF THE INVENTION

An object of the present invention is to provide a tape loading apparatus in which tape loading mechanism is simplified to reduce parts count.

A tape loading apparatus according to the present invention comprises a cam gear and a first and second arms that are pivotally mounted by a chassis. The second arm has a guiding pin, and engages the first arm through an urging spring mounted between the two arms. The first arm member is provided with a guiding pin at one end portion thereof which engages a cam groove of the cam gear and is guided along the cam groove from a first end to a second end of the groove when the cam is rotated. Before the guiding pin reaches the second end of the cam groove, the pinch roller abuts a capstan and is then pressed against the capstan by an urging force of the spring when the guiding pin reaches the second end of the cam groove.

BRIEF DESCRIPTION OF THE DRAWINGS

Features and other objects of the invention will be more apparent from the detailed description of the preferred embodiments with reference to the accompanying drawings in which.

DETAILED DESCRIPTION OF THE PREFERRED EMBODIMENTS

Figure 2:
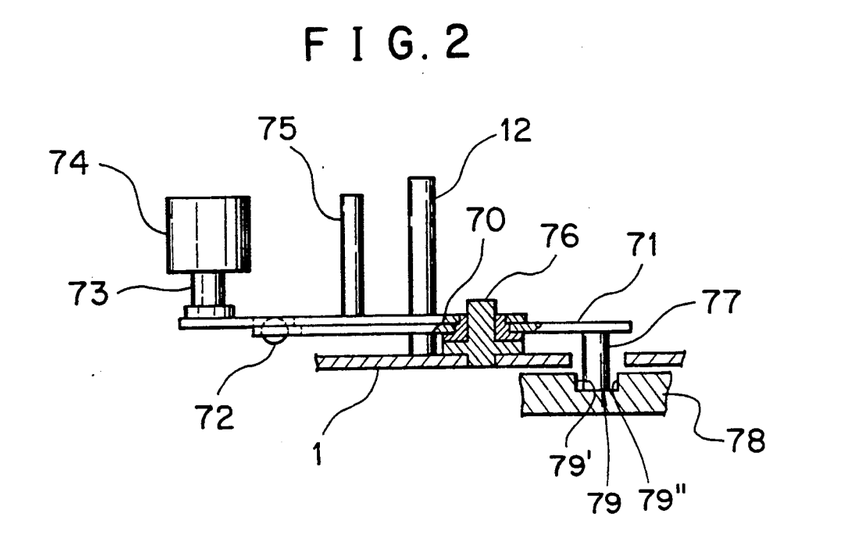
FIG. 2 is a cross-sectional view of an essential part of FIG. 1.

The present invention will now be described with reference to FIGS. 1-5. Elements similar to those in FIGS. 6-11 have been given similar reference numerals and the detailed description thereof has been omitted. A lower pinch arm plate 71 as a first pinch arm plate is pivotally supported together with an upper pinch arm plate 70 as a second arm plate, by the chassis through a pinch arm shaft 76. The second pinch arm plate 70 engages the first pinch arm 71 by means of a pressing spring 72. The lower pinch arm 71 is provided with a guiding pin 77 secured thereto which engages a cam groove 79 formed on the surface of the cam gear 78. The cam groove 78 includes a pair of radially spaced side walls 79', 79'', and the pin 77 extends into the cam groove 78 between the side walls 79, 79'', as is shown in FIG. 2. The upper pinch arm 70 is provided with a pinch roller 74 rotatably supported thereon by means of a pinch roller shaft 73.

The operation of an audio digital tape recorder of the above construction will now be described in detail.

Figure 5:
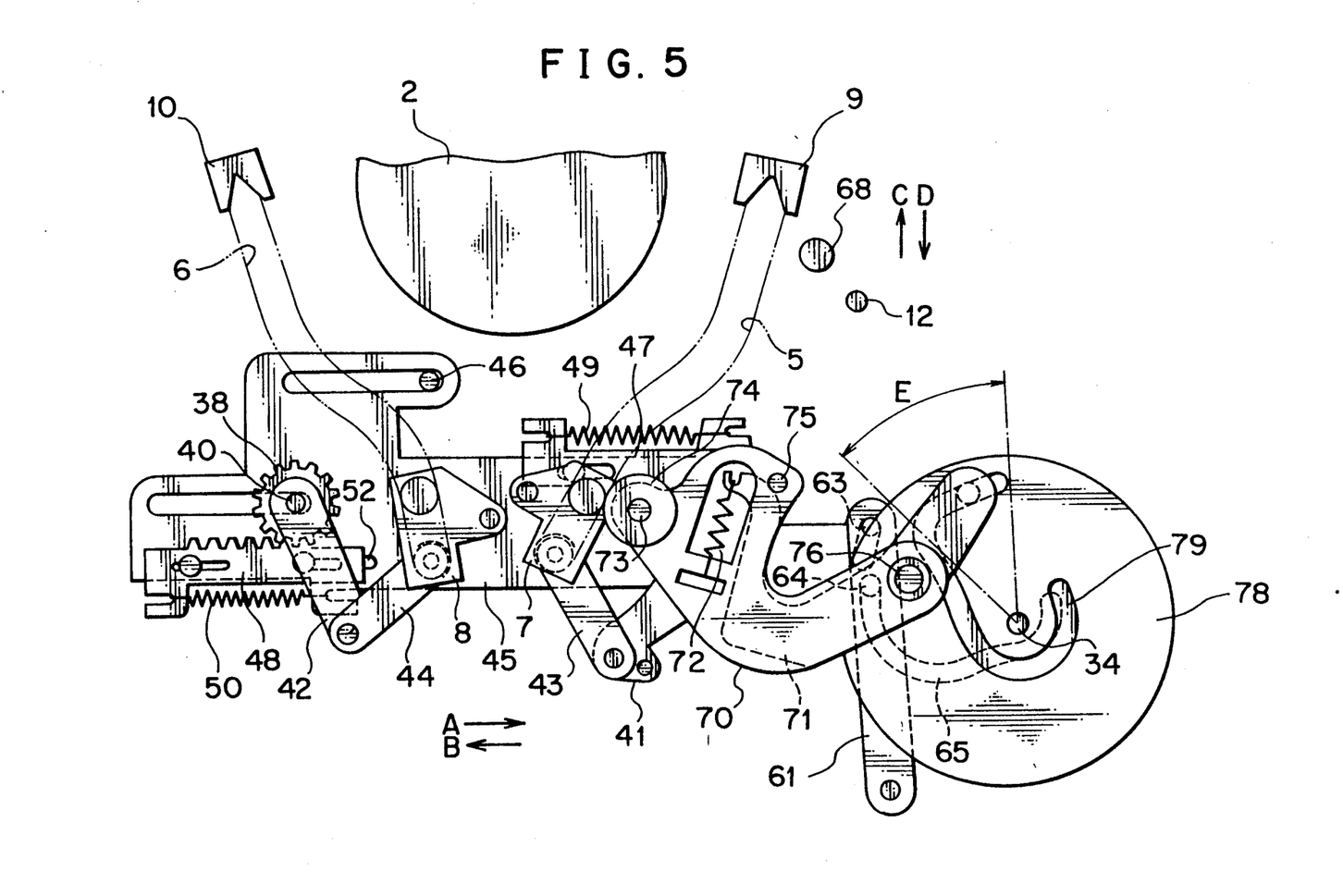
FIG. 5 is a overall top view of the tape loading apparatus shown in FIG. 1.

When the apparatus is in the unloading state where the cassette 3 is merely accommodated in the chassis 1, the guiding posts 7 and 8, the pinch roller 74, and a tape guiding roller 75 are all in the inner space of the cassette 3. As shown in FIG. 5, the engagement pin 64 of the transmission arm 61 is at a position of a large radius of the second cam groove 65 and the slide plate 45 is at the extreme end of the stroke in the direction B. The guiding pin 77 is in a region E shown in FIG. 1; therefore the lower pinch arm plate 71 are angularly positioned at the counterclockwise end of the cam groove 79.

When the loading motor 66 is operated to cause the cam gear 78 to rotate clockwise, the engaging pin 64 is guided along the second cam groove 65 which causes the transmission arm 61 to pivot clockwise, thereby moving the slide plate 45 in the direction A. The racks 47 and 48 on the slide plate 45, which are urged by the tension springs 49 and 50 against the stoppers 51 and 52, respectively, are also moved in the direction A to cause the gear 37 to rotate clockwise and the gear 38 counterclockwise. As a result, the guiding post 7 is driven by the arm 41 and the link 43 to move along the guiding groove 5 in the direction C, and the guiding post 8 is driven by the arm 42 and the link 44 to move along the guiding groove 6. When the cam gear 78 rotates clockwise, the guiding pin 77 secured to the lower pinch arm plate 71 is guided along the cam groove 79 from a region E through a region F to a region G shown in FIG. 1, causing the lower pinch arm plate 71 to pivot counterclockwise. Since the lower pinch arm plate 71 is connected to the upper pinch arm 70 by means of the pressing spring 72, the upper pinch arm 70 also moves together with the lower pinch arm. Thus, the magnetic tape 4 is drawn out towards the magnetic head drum 2 with the aid of the guiding posts 7 and 8, pinch roller 74, and the tape guiding roller 75.

Figure 3:
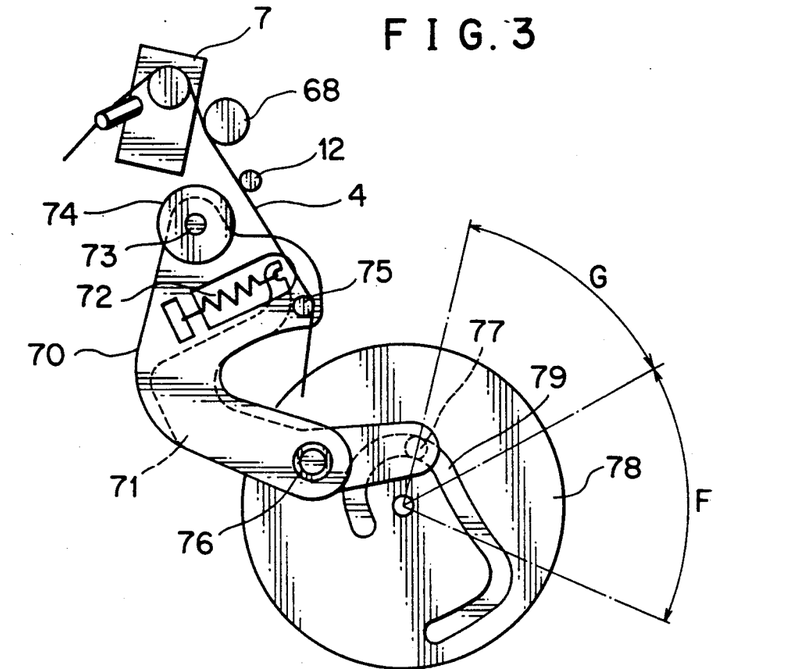
FIG. 3 is a top view of the tape loading apparatus in FIG. 1 when it is in a first loading state.
Figure 4:
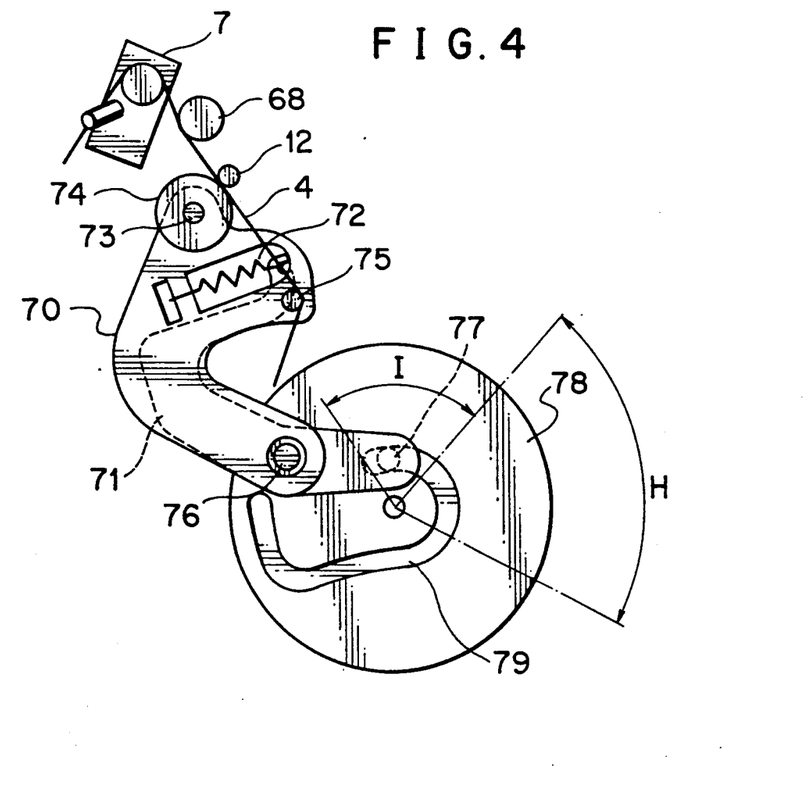
FIG. 4 is a top view of the tape loading apparatus in FIG. 1 when it is in a second loading state.

When the guiding posts 7 and 8 abut the guide stoppers 9 and 10, respectively, the guiding pin 77 has taken up a position in a region G shown in FIG. 3 and therefore the upper and lower pinch arm plates 70 and 71 are positioned as shown in FIG. 3. This is the first loading state where the pinch roller 74 has not yet been in abutting relation with the capstan shaft 12 and therefore the magnetic tape 4 is advanced only by the take up reel 23. In the first loading state, the magnetic tape 4 is wrapped around the rotary head drum 2 at the predetermined angle allowing the high speed search of the beginning of a desired tune.

Further operating the loading motor 66 causes the further clockwise rotation of the cam gear 78, during which the engaging pin 64 is guided along a small-radius circular path of the second cam groove 65 in an H region. This causes the transmission arm 61 to stop the clockwise pivotal motion thereof, which in turn brings the slide plate 45 to a stop. Since the guiding posts 7 and 8 have been in abutting relation, no further movement thereof is allowed; therefore strong resistive forces are exerted on the racks 49 and 48 by the gears 37 and 38. If such forces are exerted on the gears, the racks 49 and 48 yieldably slide relative to the slide plate 45 with the aid of the tension spring 47 and 50 to prevent unnecessary excessive meshing force between the gears and the racks. The guiding pin 77 then moves from the H region to the I region in FIG. 4 as the cam gear 78 still further rotates clockwise, during which the tape guiding roller 75 is in abutting relation with the magnetic tape 4, and the guiding pin 77 causes the lower pinch arm 71 to further pivot clockwise. Therefore, the pinch roller 74 abuts the capstan shaft 12, and is subsequently urged against the capstan shaft 12 with the aid of the urging force of the pressing spring 72 which is stretched by the clockwise pivotal motion of the lower pinch arm 71. The tape loading apparatus is now in the second loading state where the capstan shaft 12 is driven by the capstan motor 11 into rotation to advance the magnetic tape 4 for recording-and reproducing-operation of the rotary drum 2.

When the cam gear 78 is driven into counter clockwise, the first and second pinch arm plates pivot counterclockwise causing the guiding posts 7 and 8 to return the "home" position thereof, while the driven arm 61 is caused to pivot counterclockwise pushing the slide plate in the direction A. In this manner, the above mentioned tape loading apparatus returns to the unloading state thereof.

Figure 1:
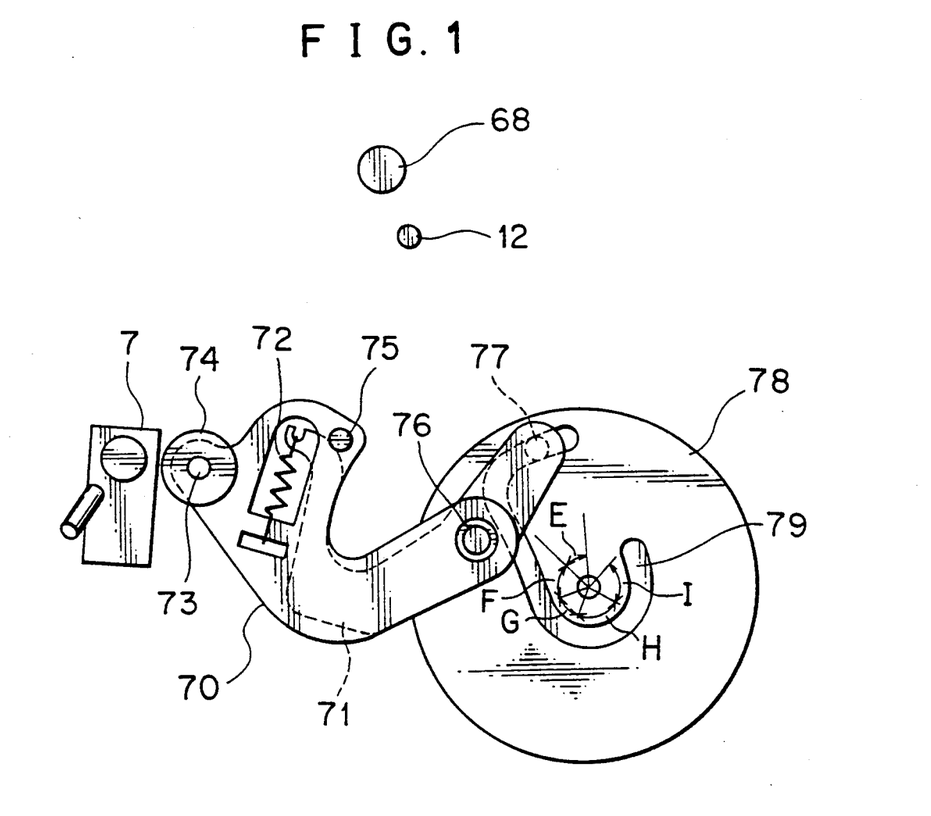
FIG. 1 is a top view of an embodiment of a tape loading apparatus according to the present invention.
Figure 1A:
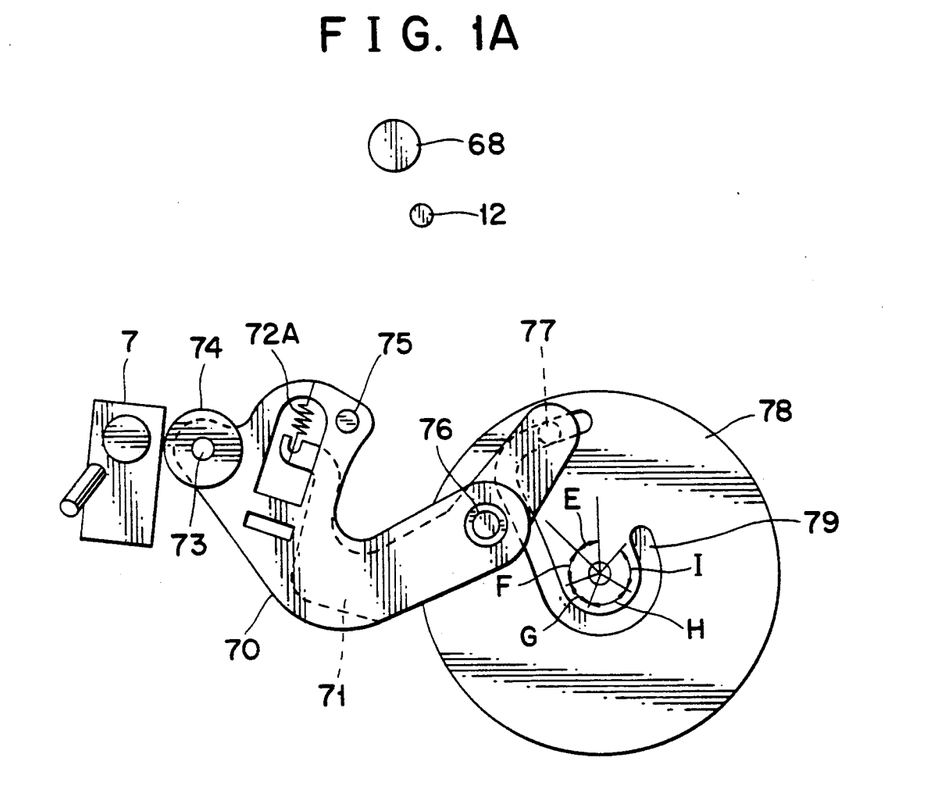
FIG. 1A is a top view of a second embodiment of the tape loading apparatus of the present invention.

As shown in FIG. 1A, the tension spring 72 may be replaced with a compression spring 72A, and the lower pinch arm plate 71 will still move the upper pinch arm plate 70 in the desired manner.

What is claimed is:

1. A tape loading apparatus comprising:
   a cam rotatably supported and formed with a cam groove on a surface thereof, said cam groove having a first end and a second end;
   a first arm member pivotally supported, said first arm member being provided with a guiding pin at one end portion thereof which engages said cam groove, said guiding pin being guided along said cam groove from said first end to said second end when said cam is rotated;
   a second arm member pivotally supported, said second arm member having at a distal end thereof a pinch roller for pressing a magnetic tape against a capstan, and having a tape guiding roller thereon; and
   a spring arrayed between said first and second arm members, wherein said pinch roller abuts the capstan before said guiding pin reaches said second end and is then pressed against the capstan by an urging force of said spring when said guiding pin reaches said second end.

* * * * *

UNITED STATES PATENT AND TRADEMARK OFFICE
CERTIFICATE OF CORRECTION

PATENT NO. : 5,128,814

DATED : July 7, 1992

INVENTOR(S) : Takao MORIMOTO

It is certified that error appears in the above-identified patent and that said Letters Patent is hereby corrected as shown below:

ON THE TITLE PAGE

In Section [54], delete "TAP" and insert -- TAPE --.

Signed and Sealed this

Tenth Day of August, 1993

Attest:

MICHAEL K. KIRK

Attesting Officer     Acting Commissioner of Patents and Trademarks